2,861,038

DEWATERING CELLULOSE ESTER COMPOSITION

Henry W. Steinmann, Madison, and Michael Dunay, Fanwood, N. J., assignors to Celanese Corporation of America, New York, N. Y., a corporation of Delaware No Drawing. Application March 3, 1955
Serial No. 492,045

6 Claims. (Cl. 210—23)

This invention relates to dewatering and relates more particularly to a process for dewatering solutions of organic acid esters of cellulose in water-immiscible solvents.

An important object of this invention is to provide an efficient, economical process for dewatering solutions of organic acid esters of cellulose in water-immiscible solvents.

A further object of this invention is to provide a dewatering process wherein water-containing solutions of organic acid esters of cellulose in water-immiscible solvents are brought into contact with one surface of a semi-permeable membrane through which the water alone can pass.

Other objects of this invention will be apparent from the following detailed description and claims.

In H. W. Steinmann, United States application, Serial No. 443,957, filed July 16, 1954, there is disclosed a process for the production of organic acid esters of cellulose in which cellulose is esterified with an organic acid anhydride in a water-immiscible solvent for the ester being formed. At the completion of the esterification, there is obtained a homogeneous solution of the ester in the water-immiscible solvent, which solution also contains some organic acid, the esterification catalyst, and other impurities. The esterification solution is then subjected to a two-phase extraction with an aqueous medium under such conditions that no precipitation of the organic acid ester of cellulose takes place in order to remove the impurities therefrom. The extracted solution, while free from impurities, is saturated with water and should have at least a portion of water removed therefrom before it is employed for the spinning of filaments, the casting of films, or the manufacture of other articles.

According to the present invention, the water is removed from a water-containing organic acid ester of cellulose solution in a water-immiscible solvent by bringing the said solution into contact with one surface of a semi-permeable membrane through which the water alone can pass. The water passes through the semi-permeable membrane, leaving behind a solution that is substantially water-free or has a materially lower water content and may be used for the spinning of filaments and the like. The water that has passed through the semi-permeable membrane is removed from the surface thereof, for example, by evaporating the same through the use of a stream of heated air so that the process will operate in a continuous manner.

The process of this invention is applicable generally to solutions of organic acid esters of cellulose in water-immiscible solvents. Examples of the organic acid esters of cellulose include cellulose acetate, cellulose propionate, cellulose butyrate, cellulose acetate propionate, cellulose acetate butyrate and cellulose benzoate. Water-immiscible solvents in which said esters may be dissolved include, for example, nitromethane, m-cresol, cyclopentanone, pyrrole and furfural. There may also be employed chlorinated hydrocarbons, for example, methylene chloride, tetrachloroethane, trichloroethane, trichloroethanol and chloroform. Instead of employing a single material as the solvent, a mixture of materials, such as those specified above may be used. The concentration of the solution is not at all critical in the process of this invention, which constitutes one of the important advantages of the process since it enables highly concentrated solutions containing more than about 10% by weight of the ester to be treated. The removal of water from such highly concentrated solutions by other processes such as distillation presents a number of difficult problems owing to the tendency for the said solutions to adhere to the surfaces of the distillation equipment.

The water present in the solution imparts to the said solution a cloudy appearance, probably owing to the formation of an emulsion in which the water is in the disperse phase. However, since no precipitation of the organic acid ester of cellulose takes place, it will be referred to herein as a solution. The proportion of water present may range up to the saturation point of the solution with respect to the water.

Cellophane, either coated or uncoated, may be employed as the semi-permeable membrane in carrying out the process of this invention. The semi-permeable membrane may be arranged to form cells for the solution being treated, or the semi-permeable membrane may take the form of tubes through which the said solution is passed. While the process of this invention may be carried out on a batch basis, it is preferred to operate in a continuous manner by flowing the solution over the surfaces of the membranes whereby a continuous stream of dewatered solution is obtained.

The water that passes through the semi-permeable membrane tends to accumulate on the surface thereof and, when a film of water has formed on said surface, to return to the solution. Such return can be prevented by removing the water from the membrane, for example, by evaporating the same with a stream of heated air. The efficiency of this process is high since only the water which is being removed must be heated to the evaporation temperature, it being unnecessary to heat the remainder of the solution, constituting the bulk thereof, to an elevated temperature.

The following examples are given to illustrate this invention further.

Example I

A 10.1% by weight solution of cellulose triacetate in methylene chloride containing 6.03% by weight of water is passed through elongated rectangular cells having cellophane membrane walls at such a rate that for each square foot of membrane 5.5 pounds of solution remain in the cells for 30.5 hours. Dry air having an initial temperature of 75° C. is blown through the cells at a rate of 8.05 cubic feet (STP) per hour for each square foot of membrane. The solution leaving the cells has a water concentration of only 0.22% by weight. The incoming solution is cloudy whereas the emerging solution is clear.

Example II

A 10.0% by weight solution of cellulose triacetate in methylene chloride containing 1.55% by weight of water is passed through cells as in Example I at such a rate that for each square foot of membrane 6.2 pounds of solution remain in the cells for 8.75 hours. Dry air having an initial temperature of 92° C. is blown through the cells at a rate of 55 cubic feet (STP) per hour for each square foot of membrane. The solution leaving the cells has a water concentration of only 0.18% by weight and is clear.

It is to be understood that the foregoing detailed description is merely given by way of illustration and that many variations may be made therein without departing from the spirit of our invention.

Having described our invention, what we desire to secure by Letters Patent is:

1. In a process wherein a solution of an organic acid ester of cellulose in a water immiscible solvent comprising methylene chloride is subjected to a two-phase extraction with an aqueous material and wherein there is recovered from said extraction an extracted solution free from impurities but containing a small percentage of water, the improvement which comprises dewatering said solution by bringing it into contact with a semi-permeable membrane through which water alone can pass and removing from the other surface of said membrane the water that has passed therethrough.

2. The process of claim 1 wherein said semi-permeable membrane is a cellophane membrane.

3. The process of claim 1 wherein said organic ester of cellulose is cellulose acetate.

4. The process of claim 1 wherein said water is removed from said other surface by passage of a heated gas thereover.

5. A process for dewatering a solution of cellulose acetate in a water immiscible solvent comprising methylene chloride, said solution containing water in an amount not greater than about 6% by weight, based on the weight of solution, which comprises bringing the water containing solution into contact with one surface of a semi-permeable membrane through which the water alone can pass and contacting the other surface of said membrane with a gas to remove therefrom the water that has passed therethrough.

6. The process of claim 5 wherein said semi-permeable membrane is a cellophane membrane.

References Cited in the file of this patent

UNITED STATES PATENTS

| | | |
|---|---|---|
| 1,573,673 | Bronstein | Feb. 16, 1926 |
| 1,885,393 | Van Schaack | Nov. 1, 1932 |
| 2,114,491 | Hollabaugh | Apr. 19, 1938 |
| 2,126,190 | Hofmann | Aug. 9, 1938 |
| 2,386,381 | Cornwall | Oct. 9, 1945 |
| 2,386,826 | Wallach et al. | Oct. 16, 1945 |

FOREIGN PATENTS

| | | |
|---|---|---|
| 696,903 | Great Britain | Sept. 9, 1953 |

OTHER REFERENCES

Kober: Journal of Am. Chem. Soc., vol. 39, pages 944–946 (1917).

Farber: Science, vol. 82, page 158 (1935).